(12) United States Patent
Okui et al.

(10) Patent No.: US 7,918,962 B2
(45) Date of Patent: Apr. 5, 2011

(54) METHOD OF MANUFACTURING ROTATION DETECTOR HAVING ENCAPSULATED BIASING MAGNET AND MAGNETIC SENSOR

(75) Inventors: Yoichi Okui, Anjo (JP); Kazuyoshi Sumiya, Hekinan (JP); Yasunori Kawamoto, Toyota (JP); Akihiko Ogino, Chita (JP)

(73) Assignee: DENSO CORPORATION, Kariya (JP)

( * ) Notice: Subject to any disclaimer, the term of this patent is extended or adjusted under 35 U.S.C. 154(b) by 194 days.

(21) Appl. No.: 12/230,714

(22) Filed: Sep. 4, 2008

(65) Prior Publication Data

US 2009/0065137 A1 Mar. 12, 2009

(30) Foreign Application Priority Data

Sep. 6, 2007 (JP) .................................. 2007-231975

(51) Int. Cl.
| | |
|---|---|
| B29C 65/00 | (2006.01) |
| B32B 37/00 | (2006.01) |
| B32B 38/04 | (2006.01) |
| B31B 1/60 | (2006.01) |
| B23K 26/00 | (2006.01) |
| G01N 21/00 | (2006.01) |
| A61N 5/00 | (2006.01) |
| G21G 5/00 | (2006.01) |

(52) U.S. Cl. .................. 156/272.8; 156/272.2; 156/60; 156/1; 219/121.64; 250/453.11; 250/492.1

(58) Field of Classification Search ................ 156/272.8, 156/272.2, 60, 1; 219/121.64; 250/453.11, 250/492.1
See application file for complete search history.

(56) References Cited

U.S. PATENT DOCUMENTS

| | | | | |
|---|---|---|---|---|
| 5,563,391 | A | * | 10/1996 | Dahm ....................... 219/121.64 |
| 6,872,911 | B2 | | 3/2005 | Weiblen et al. |
| 2004/0200569 | A1 | | 10/2004 | Weiblen et al. |
| 2005/0218123 | A1 | | 10/2005 | Hayakawa et al. |
| 2007/0075705 | A1 | | 4/2007 | Kurumado |
| 2007/0290679 | A1 | * | 12/2007 | Okui et al. ............... 324/207.25 |

FOREIGN PATENT DOCUMENTS

| | | | |
|---|---|---|---|
| JP | A-2001-194244 | | 7/2001 |
| JP | A-2003-214903 | | 7/2003 |
| JP | A-2006-275639 | | 10/2006 |
| JP | 2007040965 A | * | 2/2007 |
| JP | A-2007-040965 | | 2/2007 |
| JP | 2007232372 A | * | 9/2007 |

OTHER PUBLICATIONS

Office Action dated Aug. 25, 2009 from Japan Patent Office in corresponding JP application No. 2007-231975 (and English translation).

* cited by examiner

Primary Examiner — Khanh Nguyen
Assistant Examiner — Matthew Hoover
(74) Attorney, Agent, or Firm — Posz Law Group, PLC

(57) ABSTRACT

A rotation detector includes a semiconductor chip, a nonmagnetic case body, a biasing permanent magnet and a nonmagnetic cap fixed to the case body, wherein the case body has a joint surface, and the cap has an inside surface in contact with the joint surface. A method of manufacturing the rotation detector includes the following steps: assembling the semiconductor chip, the case body and the biasing permanent magnet into a unit; forming at least one groove adjacent to the joint surface so as to form a space between the joint surface and the inside surface when the cap is fixed to the case body; fixing the cap to the case body so that the inside surface of the cap can be in contact with the joint surface; irradiating a laser beam at portions behind the inside surface of the cap under a prescribed pressure to melt materials of the case body and the cap and to make melted materials flow to the space; and cooling the melted materials to re-crystallize.

7 Claims, 3 Drawing Sheets

METHOD OF MANUFACTURING ROTATION DETECTOR HAVING ENCAPSULATED BIASING MAGNET AND MAGNETIC SENSOR

CROSS REFERENCE TO RELATED APPLICATION

The present application is based on and claims priority from Japanese Patent Application 2007-231975, filed Sep. 6, 2007, the contents of which are incorporated herein by reference.

BACKGROUND OF THE INVENTION

1. Field of the Invention

The present invention relates to a method of manufacturing a rotation detector having a biasing permanent magnet and a magnetic sensor chip that are accommodated in a protecting cap.

2. Description of the Related Art

JP-A-2007-101230 discloses a conventional rotation detector 90 having a biasing permanent magnet and a magnetic sensor chip that are accommodated in a protecting cap.

Such a rotation detector is mounted in an internal combustion engine to detect rotation of an engine crankshaft.

The rotation detector includes a semiconductor chip (bare chip) 10, a case body 20, a biasing permanent magnet 30 and a cap 40. The rotation detector, as a whole is almost the same as a rotation detector 90 according to a preferred embodiment of the invention shown in FIG. 2A except for a portion encircled by a broken line and indicated by reference numeral 1C, which will be described later. The magnetic sensor chip 10 and the biasing permanent magnet 30 are accommodated in the cap 40 to be protected from ambient atmosphere.

The semiconductor chip 10 includes a sensing chip 11 on which a pair of magnetoresistance elements (not shown) is formed and a processor chip 12 that processes the output signals of the sensor chip. The case body 20 is made of resinous material and has a disk-shaped base portion 25 and a tongue portion 21 that projects from the base portion. The sensing chip 11, the processor chip 12 and a lead frame are interconnected and embedded in the tongue portion 21.

The biasing permanent magnet 30 is a cylindrical member having a longitudinal rectangular cavity 31, in which the semiconductor chip 10 and the tongue portion 21 are disposed. The biasing permanent magnet 30 gives the magnetoresistance elements a biasing magnetic field.

The cap 40 is a non-magnetic cylindrical member that has a generally conical brim 41 at an open end thereof and a bottom at the other end. The brim 41 has a conical inside surface 41t that expands wide toward the joint surface 25t from the open end 41, and the base portion 25 is formed to have a generally tapering joint surface 25t. The brim 41 is fixed to the base portion 25. Thus, the sensing chip 11, the tongue portion 21 and the biasing permanent magnet 30 are protected from ambient atmosphere.

This rotation detector is disposed near a portion of an engine crankshaft so that the right end thereof confronting the portion of the engine crankshaft. When the crankshaft rotates, the biasing magnetic field that is given by the biasing magnet changes, so that the sensing chip provides signals, which are processed by the processor chip in a prescribed manner to detect a rotation angle, a rotation speed, etc.

In manufacturing, the case body 20, the biasing permanent magnet 30 and the cap 40 are assembled in a prescribed manner, and the brim 41 of the cap 40 is pressed against the base portion 25 so that the conical inside surface 41t can be brought into close contact with the tapering joint surface 25t. Thus, the cap 40 is positioned coaxial with the case body 20, as shown in FIG. 3A. In the meantime, the biasing permanent magnet 30 is urged by the bottom of the cap 40 so that the inside surface thereof can be fitted to the base portion 25.

Thereafter, the brim 41 of the cap 40 and the base portion 25 of the case body 20 is welded by a laser welder. In more detail, a laser beam is irradiated at the outside surface of the brim 41 (behind the inside surface 41t) to melt the tapering joint surface 25t of the base portion 25 and the inside surface 41t of the brim 41. Accordingly, a mixture of melted materials of the base portion 25 and the brim 41 is produced in the boundary area between the joint surface 25t and the inside surface 41t and also at the circumference of the brim 40, as shown in FIG. 3B. When the laser welding is stopped, the melted materials cools down and starts to re-crystallize, so that the cap 40 and the case body 20 are firmly fixed.

However, it has been sometimes found that an uneven joint area 50 and burrs or fins 60 shown in FIG. 3C.

As a result, the uneven joint area 50 distorts the tapering surface 25t of the base portion 25, so that the axis of the cap 40 may diverge from the axis of the case body 20, and the burrs and fins 60 may ruin the coaxial relation of cap 40 with the case body 20. This may cause an inaccurate detection of rotation.

SUMMARY OF THE INVENTION

Therefore, an object of the invention is to provide an improved method of manufacturing a rotation detector having a biasing permanent and a magnetic sensor that are accommodated in a protecting cap.

According to a feature of the invention, a method of manufacturing a rotation detector is composed of: assembling a semiconductor chip, a case body and a biasing permanent magnet into a unit: forming at least one groove adjacent to a joint surface of the case body so as to form a space between the joint surface and an inside surface of the cap when the cap is fixed to the case body; fixing the cap to the case body so that the inside surface of the cap can be in contact with the joint surface; irradiating a laser beam at portions behind the inside surface of the cap under a prescribed pressure to melt materials of the case body and the cap and to make melted materials flow to the space; and cooling the melted materials to re-crystallize.

In addition to the above feature of the invention, the following features are preferable: the laser transmittance of the case body is preferably less than the laser transmittance of the cap; each of the case body and the cap is made of polyphenilene sulfide, and the case body contains more carbon black than the cap; a step of rotating the case body and the cap while irradiating a laser beam is provided; the pressure in the step of irradiating laser is applied to the bottom end of the cap; and the joint surface of the case body is tapered; and the inside surface of the cap is shaped conical to be in close contact with the joint surface.

Another object of the invention is to provide an improved rotation detector that is manufactured by the above method.

According to another feature of the invention, a rotation detector includes a semiconductor chip, a resinous case body having a joint surface, a biasing permanent magnet, and a resinous cap having a conical inside surface fixed to the joint surface of the case body, for accommodating therein the semiconductor chip and the biasing permanent magnet, wherein: the case body has at least one space between a portion adjacent to the joint surface and the inside surface of the cap to accommodate material melted when the case body and the cap are thermally welded.

In addition to this feature, the following features are preferable: the laser transmittance of the case body is less than the laser transmittance of the cap; each of the case body and the cap is made of polyphenilene sulfide, and the case body contains more carbon black than the cap.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1A:
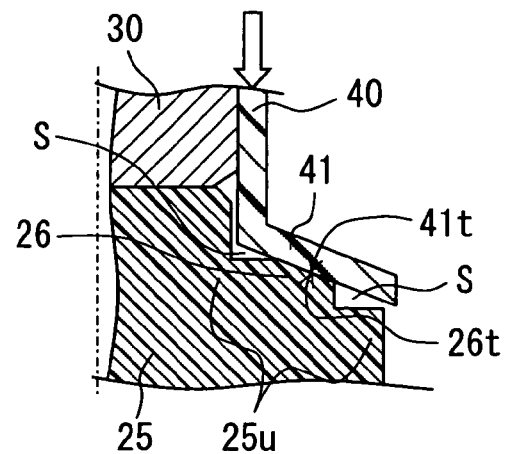
FIGS. 1A, 1B and 1C illustrate a method of fixing the cap to the case body in manufacturing a rotation detector according to a preferred embodiment of the invention.
Figure 1B:
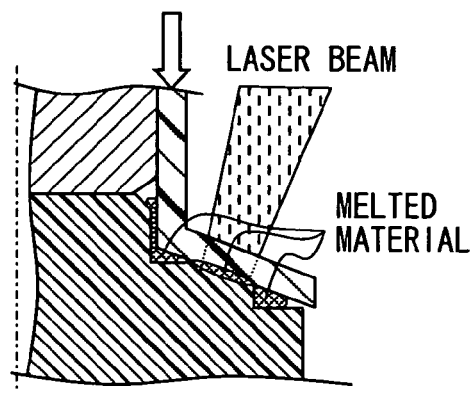
Figure 1C:
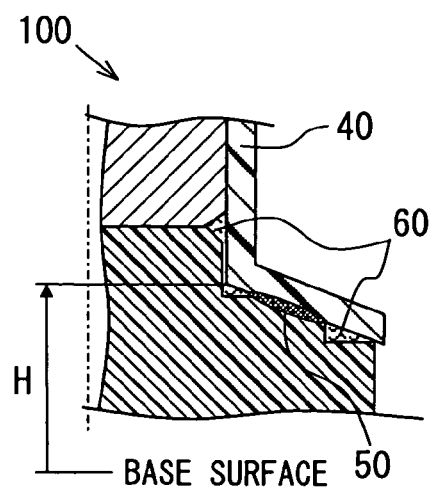
Figure 2A:
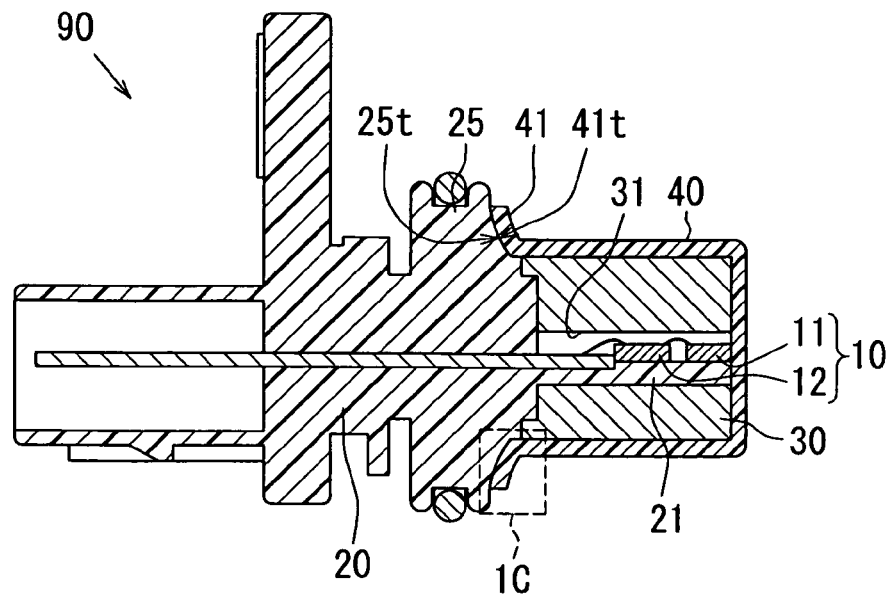
FIGS. 2A and 2B illustrate a rotation detector to which the method of fixing according to the preferred embodiment is applied.
Figure 2B:
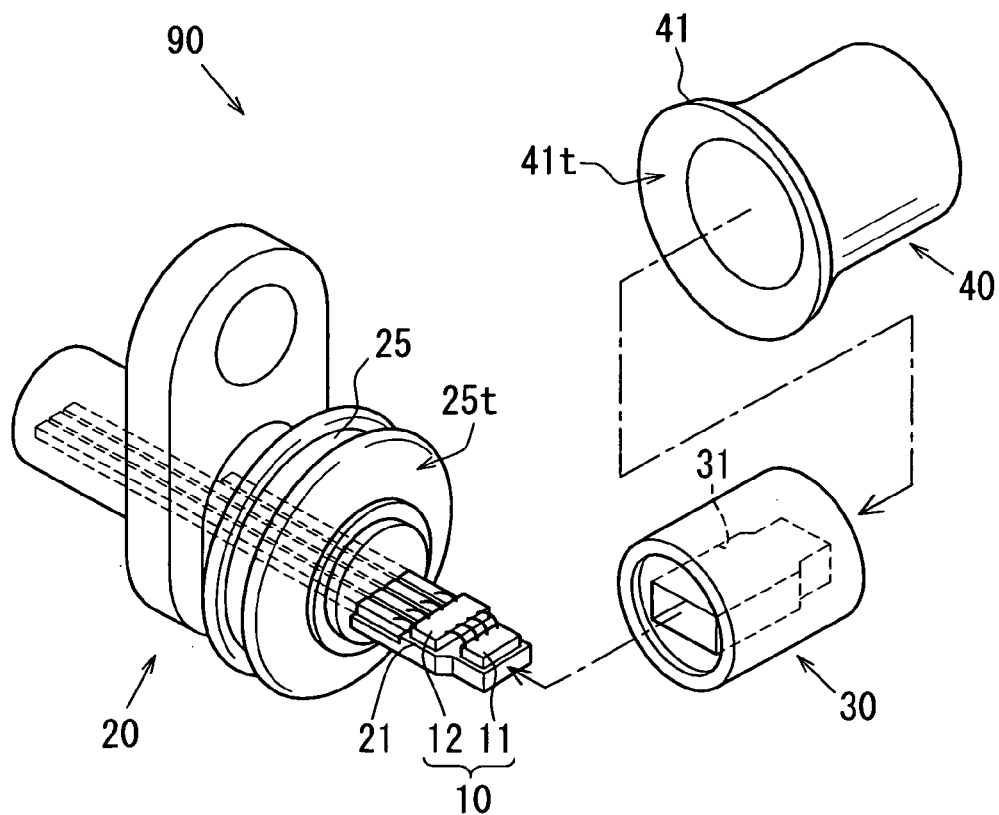

A preferred embodiment according to the present invention will be described with reference to FIGS. 1A, 1B and 1C and FIGS. 2A and 2B. FIGS. 1A, 1B and 1C illustrate fixing steps of a portion of the rotation detector 100 encircled by a broken line that is indicated as 1C.

Figure 3A:
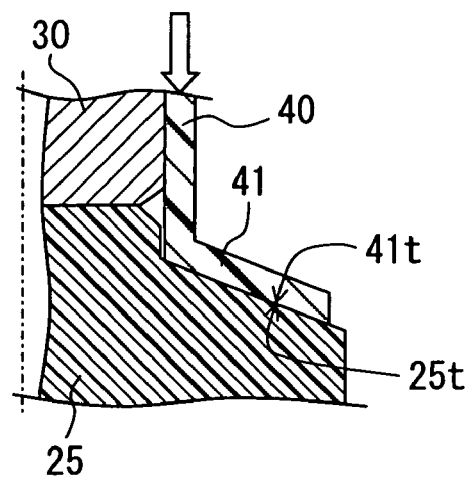
FIGS. 3A, 3B and 3C illustrate a conventional method of fixing in manufacturing a rotation detector.
Figure 3B:
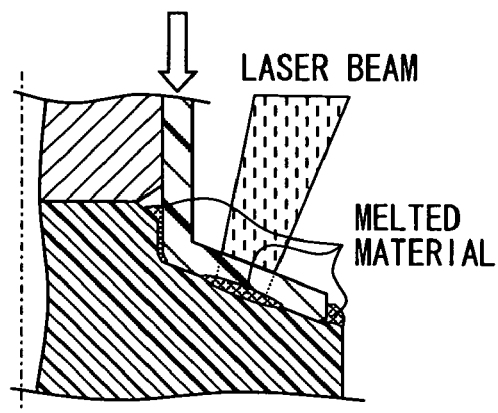
Figure 3C:
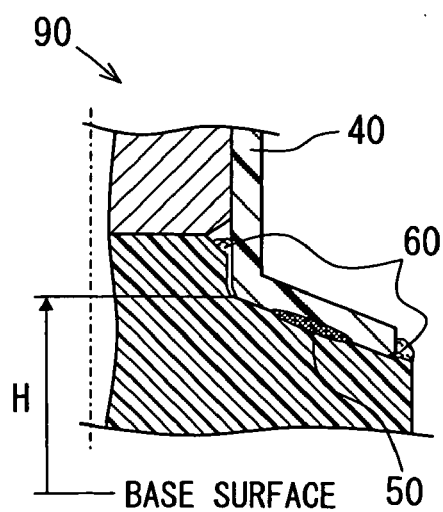

Incidentally, the description of the rotation detector that is already described above will be omitted, and the same reference numeral in FIGS. 1A, 1B and 1C as that used in the above "Description of the Related Art" indicates the same or substantially the same portion, part or member as that shown in FIGS. 3A, 3B and 3C.

The base portion 25 has a joint portion 26 that confronts the conical inside surface 41t of the brim 40. The joint surface 26 has a tapering joint surface 26t and ring-shaped grooves that circumferentially surround the joint surface 26t on the opposite sides thereof. As shown in FIG. 1A, the brim 41 of the cap 40 is pressed against the base portion 25 of the case body 20 so that the conical inside surface 41t can be brought into close contact with the tapering joint surface 26t. Specifically, the joint portion 26 protrudes from a contact surface 25u of the base portion 25. Thereafter, a laser beam is irradiated at the outside surface of the brim 41 to melt the tapering joint surface 26t of the base portion 25 and the inside surface 41t of the brim 41. Because the grooves formed adjacent, or on the opposite circumferences of, the tapering joint surface 26t provides heat resistive spaces S, heat of the laser beam is not much dissipated. Accordingly, a mixture of melted materials 60 of the base portion 25 and the brim 41 is produced in the boundary area between the joint surface 26t and the inside surface 41t and also at the circumferences of the joint surface 26t, as shown in FIG. 1B.

The mixture of the melted material naturally flows to the spaces S by a capillary tube phenomena. Because the grooves and the inside surface 41t of the brim 40 form sufficient spaces S for accommodating the melted material that flows therein, the joint area 50 can be kept smooth and even.

Although both the case body 20 and the cap 40 are made of PPS (polyphenilene sulfide), the material of the case body 20 contains more carbon black than the material of the cap 40. Therefore, the case body 20 has a less laser transmittance than the cap 40. In other words, the case body 20 has a more laser absorptance than the cap 40. It is more preferable that the laser beam is irradiated while the case body 20, together with the cap 40, is turned about the center axis of the assembly (one-dot chain line). Thus, the case body 20 and the cap 40 can be fixed by evenly melted material.

Thereafter, the irradiation of the laser is stopped to let the melted materials to cool down and re-crystallize, as shown in FIG. 1C. Therefore, the burrs or fins 60 is not formed.

When the melted materials 60 fill in the space S under pressure applied to the cap 40 against the case body 20, the height H of the base of the brim 41 from a preset base surface becomes smaller. However, the mixture of the melted materials 60 functions to gradually stop reducing the height H before the laser beam irradiation is stopped. Therefore, the height H can be accurately controlled.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A method of manufacturing a rotation detector that comprises a semiconductor chip, a nonmagnetic case body, a biasing permanent magnet and a nonmagnetic cap fixed to the case body for accommodating therein the semiconductor chip and the biasing permanent magnet, wherein: the case body has a joint surface; and the cap has an inside surface in contact with the joint surface, the method comprising:

assembling the semiconductor chip, the case body and the biasing permanent magnet into a unit;

forming at least one groove adjacent to the joint surface so as to form a space between the joint surface and the inside surface when the cap is fixed to the case body;

fixing the cap to the case body so that the inside surface of the cap can be in contact with the joint surface;

irradiating a laser beam at portions behind the inside surface of the cap under a prescribed pressure to melt materials of the case body and the cap and to make melted materials flow to the space;

filling the melted materials in the space under the prescribed pressure;

stopping irradiation of the laser beam when the melted materials function to gradually stop reducing a height of the inside surface of the cap from the joint surface of the case body; and cooling the melted materials to re-crystallize.

2. A method as in claim 1, wherein the laser transmittance of the case body is less than the laser transmittance of the cap.

3. A method as in claim 2, wherein:

each of the case body and the cap is made of polyphenilene sulfide; and the case body contains more carbon black than the cap.

4. A method as in claim 1, further comprising rotating the case body and the cap while irradiating a laser beam.

5. A method as in claim 4, wherein the pressure in irradiating is applied to the bottom end of the cap.

6. A method as in claim 1, wherein:

the joint surface of the case body is tapered; and the inside surface of the cap is shaped conical to be in close contact with the joint surface.

7. A method as in claim 1, wherein:

the joint surface of the case body is tapered;

the joint surface of the case body has a plurality of ring-shaped grooves, including the at least one groove, that circumferentially surround the joint surface on the opposite sides thereof; and the inside surface of the cap is shaped conical and the conical inside surface confronts the tapered joint surface.

\* \* \* \* \*